US010824386B2

United States Patent
Aist et al.

(10) Patent No.: US 10,824,386 B2
(45) Date of Patent: Nov. 3, 2020

(54) NAVIGATION SYSTEM WITH MESSAGE INTERCHANGE MECHANISM AND METHOD OF OPERATION THEREOF

(71) Applicant: Telenav, Inc., Santa Clara, CA (US)

(72) Inventors: Gregory S. Aist, Santa Clara, CA (US); Naveen Kumar Vandanapu, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 239 days.

(21) Appl. No.: 15/207,243

(22) Filed: Jul. 11, 2016

(65) Prior Publication Data

US 2018/0011680 A1 Jan. 11, 2018

(51) Int. Cl.
*G06F 3/16* (2006.01)
*H04W 4/12* (2009.01)

(52) U.S. Cl.
CPC .............. *G06F 3/165* (2013.01); *H04W 4/12* (2013.01)

(58) Field of Classification Search
CPC ............ G01C 21/3644; G01C 21/3697; G01C 21/3626; G01C 21/00; G01C 21/3655; G01C 21/3617; G01C 21/3629; G10L 15/222; G10L 25/48; G06F 13/26; G06F 3/165; H04W 4/12
USPC ...... 340/995.12; 700/94; 701/400, 431, 457; 709/207; 710/48
See application file for complete search history.

(56) References Cited

U.S. PATENT DOCUMENTS

| 6,542,868 | B1 * | 4/2003 | Badt | ....................... G10L 13/00 |
| | | | | 704/270 |
| 7,254,544 | B2 | 8/2007 | Ota et al. | |
| 9,031,781 | B2 | 5/2015 | Li et al. | |
| 2011/0301728 | A1 * | 12/2011 | Hamilton | ............. G11B 27/034 |
| | | | | 700/94 |
| 2013/0184981 | A1 * | 7/2013 | Vogedes | ............. G01C 21/3629 |
| | | | | 701/400 |
| 2013/0322665 | A1 * | 12/2013 | Bennett | ............ G08G 1/096855 |
| | | | | 381/300 |
| 2017/0357475 | A1 * | 12/2017 | Lee | ........................ G05B 15/02 |

* cited by examiner

*Primary Examiner* — Duc Nguyen
*Assistant Examiner* — Alexander L Eljaiek
(74) *Attorney, Agent, or Firm* — Perspectives Law Group, Corp.

(57) ABSTRACT

A method of operation of a navigation system includes: detecting a message overlap between a current audio message and a message delivery timeframe of a contemporaneous audio message; determining an audio message interchange between the current audio message and a contemporaneous audio message based on a message waveform of the current audio message, a remaining message duration of the current audio message, or a combination thereof; and delivering the current audio message and the contemporaneous audio message based on the audio message interchange.

20 Claims, 5 Drawing Sheets

NAVIGATION SYSTEM WITH MESSAGE INTERCHANGE MECHANISM AND METHOD OF OPERATION THEREOF

TECHNICAL FIELD

An embodiment of the present invention relates generally to a navigation system, and more particularly to a system for audio communication management.

BACKGROUND

Modern consumer and industrial electronics, especially devices such as navigation systems, cellular phones, smart phones, portable digital assistants, and combination devices, are providing increasing levels of functionality to support modern life including delivery of audio communication services. Research and development in the existing technologies can take a myriad of different directions.

As more devices include text-to-speech and audio e-mail features, device owners insist on using their devices to provide increased support of audio messaging capabilities. Furthermore, to improve productivity, these devices require handling delivery of multiple contemporaneous messages through their devices.

Thus, a need still remains for a navigation system with message interchange mechanism for audio communication management. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a system, including: a control unit configured to: detect a message overlap between a current audio message and a message delivery timeframe of a contemporaneous audio message; determine an audio message interchange between the current audio message and a contemporaneous audio message based on a message waveform of the current audio message, a remaining message duration of the current audio message, or a combination thereof; and a first user interface, coupled to the control unit, configured to deliver the current audio message and the contemporaneous audio message based on the audio message interchange.

An embodiment of the present invention provides a method including: detecting a message overlap between a current audio message and a message delivery timeframe of a contemporaneous audio message; determining an audio message interchange between the current audio message and a contemporaneous audio message based on a message waveform of the current audio message, a remaining message duration of the current audio message, or a combination thereof; and delivering the current audio message and the contemporaneous audio message based on the audio message interchange.

An embodiment of the present invention provides a non-transitory computer readable medium including instructions for a navigation system comprising detecting a message overlap between a current audio message and a message delivery timeframe of a contemporaneous audio message; determining an audio message interchange between the current audio message and a contemporaneous audio message based on a message waveform of the current audio message, a remaining message duration of the current audio message, or a combination thereof; and delivering the current audio message and the contemporaneous audio message based on the audio message interchange.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
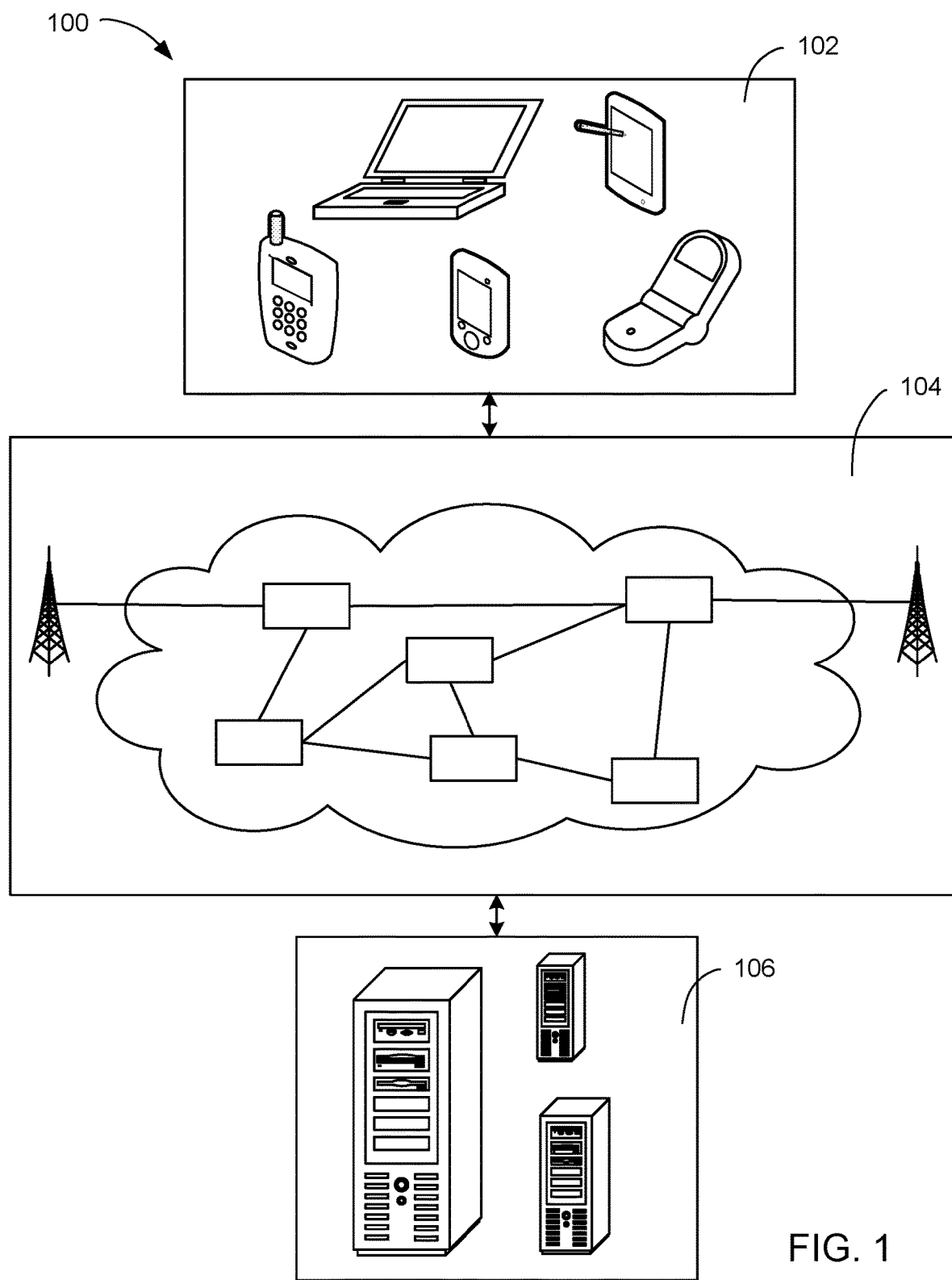
FIG. 1 is a navigation system with message interchange mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a navigation system 100 with message interchange mechanism in an embodiment of the present invention. The navigation system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of computing devices, such as mobile computing devices, such as cellular phone, personal digital assistant, tablet computers, smart watches, or smart phones; notebook computers, desktop computers, stand global positioning system navigation devices, or vehicle based navigation computers. The first device 102 can couple, either directly or indirectly, to the communication path 104 to communicate with the second device 106 or can be a stand-alone device.

The second device 106 can be any of a variety of centralized or decentralized computing devices, or video transmission devices. For example, the second device 106 can be a multimedia computer, a laptop computer, a desktop computer, grid-computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the communication path 104 to communicate with the first device 102.

For illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (lrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
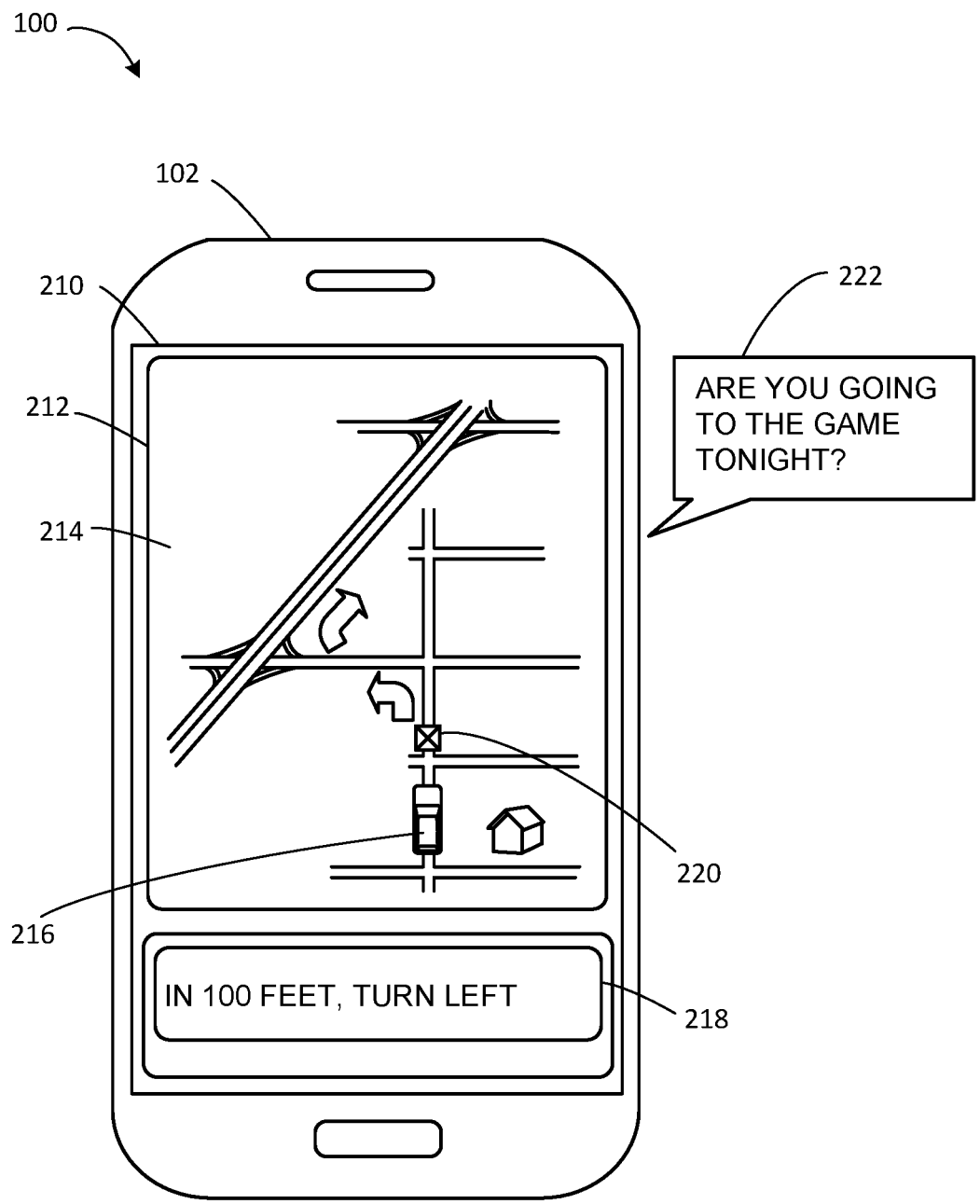
FIG. 2 is an example of a display interface of the first device of FIG. 1.

Referring now to FIG. 2, therein is shown an example of a display interface 210 of the first device 102 of FIG. 1. The display interface 210 is depicted as a graphical user interface, such as a display screen. The display interface 210 can display a navigation interface 212. The navigation interface 212 is an interface for presenting navigation information. For example, the navigation interface 212 can present a navigation map 214, which is a graphical representation of physical geographic area.

The navigation interface 212 can include a graphical representation of the current location 216 of the first device 102 on the navigation map 214. The current location 216 is defined as the physical location or position of the device or the user at a specific point in time. As an example, the navigation interface 212 can present the current location 216 of the device on the navigation map 214 as a graphical representation, such as an icon or marker.

The navigation interface 212 can include navigation notifications 218. The navigation notifications 218 are notifications related to use of the navigation interface 212. For example, the navigation notifications 218 can include travel instruction for travel along a route. In another example, the navigation notifications 218 can include information regarding the conditions along a travel route, such as traffic conditions, road conditions, or updates to the travel route.

The navigation interface 212 can include a navigation notification point 220, which is depicted in FIG. 2 as the boxed "X". The navigation notification point 220 is a trigger for delivery of the navigation notifications 218. For example, the navigation notification point 220 can be a trigger based on distance or time to alert the user of an upcoming navigation event, such as a turn or navigation maneuver. For example. Once the user of the device reaches the location represented by the navigation notification point 220, the navigation system can be triggered to deliver the audio communication 222 as the navigation notification 218 associated with the navigation notification point 220. For illustrative purposes, the navigation interface 212 is shown with the navigation notification point 220, although it is understood that the navigation notification point 220 can be hidden or not displayed on the navigation interface 212.

The navigation system 100 can deliver the audio communication 222 through the first device 102. The audio communication 222 can be a notification or message for the user. For example, the audio communication 222 can include an audio presentation of the navigation notifications 218. In another example, the audio communication 222 can include a personal communication to the user. As a specific example, the personal communication can be a text based message, such as an e-mail or text message, which has been converted into an audio format through, for example, a text to speech program or application. The audio communication 222 is illustrated with the callout box and, as an example, includes the message that states "Are you going to the game tonight?" The message intersperse mechanism of the navigation system 100 can enable the first device 102 to manage delivery of contemporaneous instances of the audio communication 222, which will be discussed below.

The navigation system 100 can be capable of playing media content during delivery of the audio communication 222. The media content can include audio content, such as music, podcasts, or other forms of audible information or entertainment media. Concurrent delivery of media content with the audio communication 222 will be discussed below.

Figure 3:
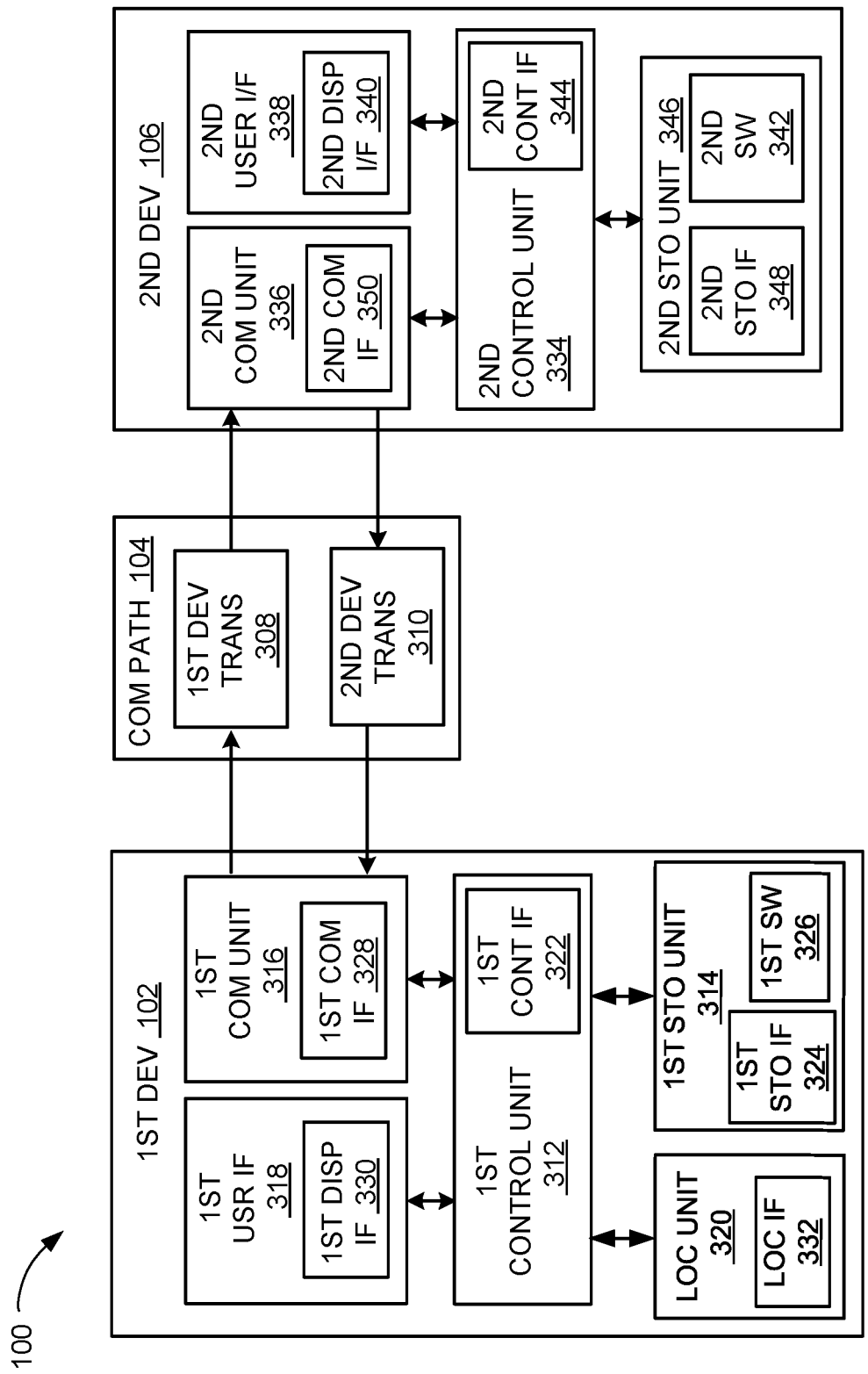
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming communications, data representing previously presented messages, sound files, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, softkeys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the such as data representing incoming communications, data representing previously presented messages, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100.

Figure 4:
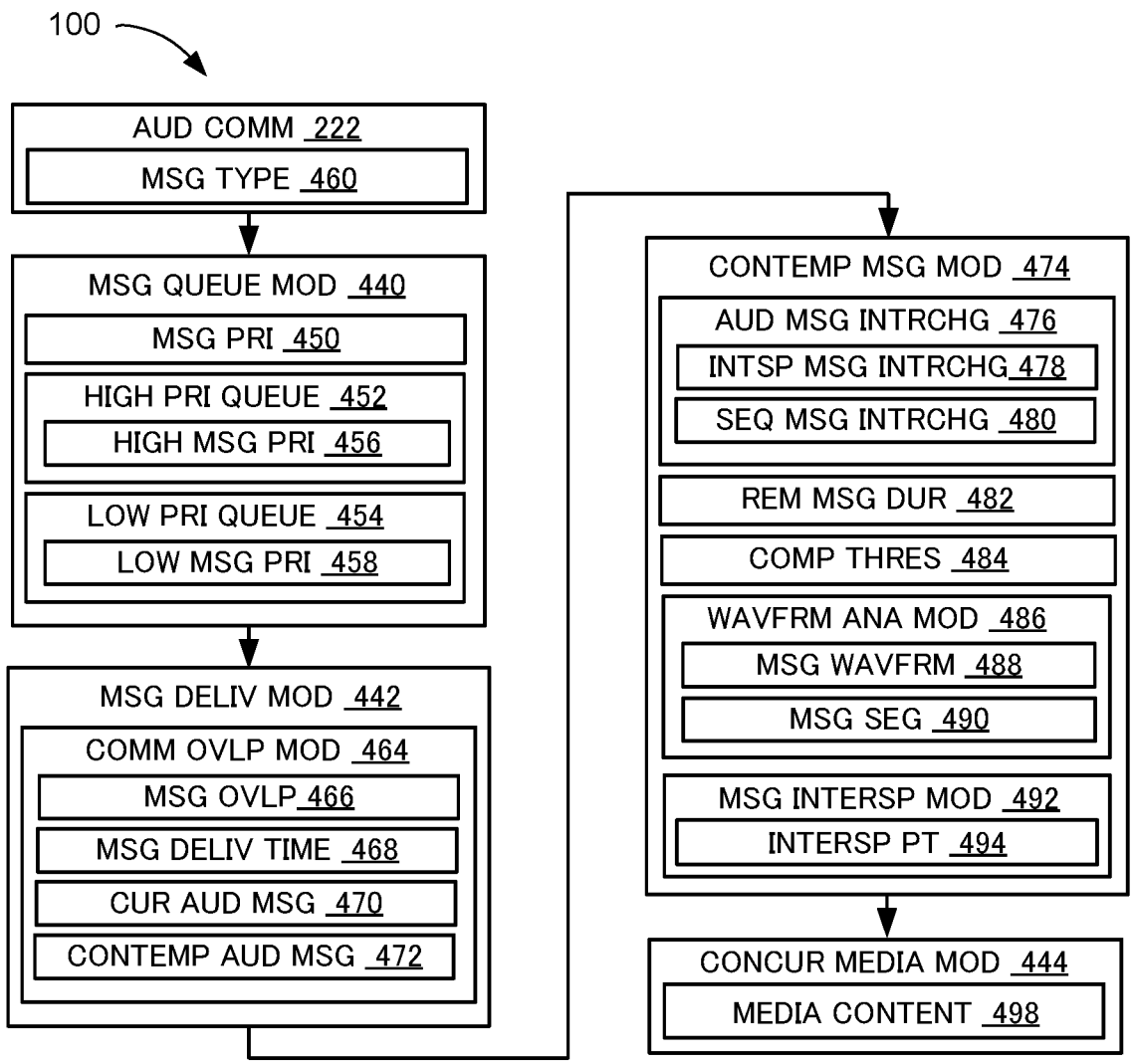
FIG. 4 is a control flow of the navigation system.

Referring now to FIG. 4, therein is shown a control flow of the navigation system 100. The navigation system 100 can include a queue management module 440, a message delivery module 442, and a concurrent media module 444. The message delivery module 442 can be coupled to the queue management module 440. The concurrent media module 444 can be coupled to the message delivery module 442.

The queue management module 440 is for managing a queue of one or more instances of the audio communication 222 and providing the audio communication 222 for delivery based on the priority associated with the audio communication 222. For example, the navigation system 100 can implement the queue management module 440 when the navigation system 100 receives or generates one or more of the audio communication 222. The queue management module 440 can place the audio communication 222 into a message queue based on a message priority 450 of the audio communication 222.

The message priority 450 is an indication of the relative order that multiple instances of the audio communication 222 should be delivered by the navigation system 100. For example, an instance of the audio communication 222 having a high message priority 456 can be delivered before an instance of the audio communication 222 having a low message priority 458.

The queue management module 440 can determine the message priority 450 based on a message type 460. The message type 460 is a categorization or description of the audio communication 222. For example, the message type 460 can be navigation notifications 218 or the personal communication. As an example, the message type 460 for the audio communication 222 of the navigation notifications 218 can have the high message priority 456. As another example, the message type 460 for the audio communication 222 of personal communication can have the low message priority 458. In another example, the message priority 450 can be based on the time sensitivity for delivery of the audio communication 222, such as prioritizing instances of the audio communication 222 that will expire or become irrelevant if not delivered immediately or within a specific time frame.

The queue management module 440 can manage the queue of one or more instances of the audio communication 222 with a high priority queue 452 and a low priority queue 454. For example, the high priority queue 452 can store one or more instances of the audio communication 222 having the high message priority 456. In another example, the low priority queue 454 can store one or more instances of the audio communication 222 having the low message priority 458.

Optionally, the queue management module 440 can operate with a single instance of a message queue as opposed to the high priority queue 452 and the low priority queue 454. For example, the queue management module 440 can place all the incoming instances of the audio communication 222 into the message queue. To continue the example, the queue management module 440 can examine the message priority 450 of each instance of the audio communication 222 when the message queue contains more than one instance of the audio communication 222. To further the example, the queue management module 440 can provide the instances of the audio communication 222 having the high message priority 456 before providing the instances of the audio communication 222 having the low message priority 458. For illustrative purposes, the queue management module 440 is described below with the high priority queue 452 and the low priority queue 454, although it is understood that the queue management module 440 can be implemented with the message queue.

The queue management module 440 can provide the audio communication 222 having the high priority queue 452, the low priority queue 454, or a combination thereof to the message delivery module 442. The message delivery module 442 can deliver the audio communication 222 through the first device 102 of FIG. 1 based on detection of a message overlap 466. The message overlap 466 occurs when delivery of an instance of the audio communication 222 will be contemporaneous with the delivery of another instance of the audio communication 222.

The message delivery module 442 can determine the message overlap 466 with a communication overlap module 464. The communication overlap module 464 can determine the message overlap 466 between two instances of the audio communication 222 based on a message delivery timeframe 468.

The message delivery timeframe 468 is the point in time that the audio communication 222 is scheduled for delivery through the first device 102. For example, the message delivery timeframe 468 for the audio communication 222 of the navigation notifications 218 can be based on proximity to the navigation notification point 220 of FIG. 2. In another example, the message delivery timeframe 468 for the audio communication 222 of a personal communication can be as soon as possible.

As an example, the communication overlap module 464 can detect the message overlap 466 when the message delivery timeframe 468 for an instance of the audio communication 222 having the high message priority 456 overlaps the delivery of the audio communication 222 having the low message priority 458. In another example, the communication overlap module 464 can detect the message overlap 466 when the message delivery timeframe 468 for an instance of the audio communication 222 having the low message priority 458 overlaps the delivery of the audio communication 222 having the high message priority 456.

When the message overlap 466 is not detected, the message delivery module 442 can deliver the audio communication 222 received from the queue management module 440. For example, when the high priority queue 452 goes from an empty state to a non-empty state and the low priority queue 454 remains empty, the queue management module 440 can provide the audio communication 222 from the high priority queue 452 to the first communication unit 316 for delivery through the first device 102. Similarly, when the low priority queue 454 goes from an empty state to a non-empty state and the high priority queue 452 remains empty, the queue management module 440 can provide the audio communication 222 from the low priority queue 454 to the first communication unit 316 for delivery through the first device 102.

In general, when both the low priority queue 454 and the high priority queue 452 are in a non-empty state, the queue management module 440 will provide the audio communication 222 from the high priority queue 452 until the high priority queue 452 is empty. Once the high priority queue 452 is empty, the queue management module 440 will provide the audio communication 222 from the low priority queue 454.

The queue management module 440 can provide the instances of the audio communication 222 to the message delivery module 442 from the high priority queue 452 and the low priority queue 454, respectively, in a sequential manner. More specifically, instances of the audio communication 222 can be provided following a first-in, first out protocol to preserve the order of the instances of the audio communication 222. For example, for high priority queue 452 can include two instances of the audio communication 222 of the navigation notification 218: "stay in the right lane" and "turn right on main street." In this example, the first instance of the navigation notification 218 must be delivered before the second instance of the navigation notification 218 for proper guidance.

When the communication overlap module 464 detects the message overlap 466, the message delivery module 442 can implement a contemporaneous message module 474 to determine an audio message interchange 476. The audio message interchange 476 is an instruction for determining the interchange between overlapping instances of the audio communication 222. For example, the audio message interchange 476 can be an instruction to intersperse or delay delivery of a contemporaneous audio message 472 during delivery of a current audio message 470. The current audio message 470 is the audio communication 222 that is being delivered by the navigation system 100. The contemporaneous audio message 472 is the audio communication 222 having the message delivery timeframe 468 that coincides with the delivery of the current audio message 470.

The audio message interchange 476 can be determined based on a message waveform 488, a remaining message duration 482, or a combination thereof. The remaining message duration 482 is the time remaining for delivery of a message from the point of the message delivery timeframe 468 of the contemporaneous audio message 472.

In one implementation, the contemporaneous message module 474 can determine the audio message interchange 476 with the remaining message duration 482 based on a completion threshold 484. The completion threshold 484 is a threshold to determine whether the delivery of the current audio message 470 is near completion. As an example, the completion threshold 484 can be set as a time increment or a percentage based on the total length of the current audio message 470. As a specific example, the completion threshold 484 can be set as a period of seconds or, in another example, 90% completion, although it is understood that the completion threshold 484 can be any value or percentage to enable timely delivery of the contemporaneous audio message.

In this implementation, the contemporaneous message module 474 can determine the audio message interchange 476 as an interspersed message interchange 478 when the remaining message duration 482 of the current audio message 470 exceeds the completion threshold 484. Similarly, the contemporaneous message module 474 can determine the audio message interchange 476 as a sequential message interchange 480 when the remaining message duration 482 of the current audio message 470 is below or within the completion threshold 484.

The sequential message interchange 480 is an instruction to interchange the contemporaneous audio message 472 sequentially after the delivery of the current audio message 470. In general, the sequential message interchange 480 is determined when the current audio message 470 is the audio communication 222 having the low message priority 458.

It has been discovered that determining the sequential message interchange 480 based on the completion threshold 484 provides improved management of contemporaneously available instances of the audio communication 222. Comparison of the remaining message duration 482 to the completion threshold 484 enables the navigation system 100 to complete delivery of the current audio message 470 that is almost complete, which avoids unnecessary interruption and maintains delivery of the contemporaneous audio message 472 in a timely manner.

The interspersed message interchange 478 is an instruction to interchange the current audio message 470 and the contemporaneous audio message 472 by interspersing the contemporaneous audio message 472 during the delivery of the current audio message 470. The contemporaneous message module 474 can determine the interspersed message interchange 478 based on a message waveform 488 of the current audio message 470. The message waveform 488 is a representation of the audio signal of the audio communication 222.

The contemporaneous message module 474 can implement a waveform analysis module 486 to analyze the message waveform 488. More specifically, the waveform analysis module 486 can analyze the message waveform 488 to identify message segments 490 in the current audio message 470.

The message segments 490 are portions of the audio communication 222 containing whole words or phrases. As an example, the content of the audio communication 222 of the current audio message 470 can be "are you going to the game tonight?" In this example, the analysis of the message waveform 488 can identify the message segments 490 of "are," "you," "going," "to," "the," "game," and "tonight."

The waveform analysis module 486 can analyze the message waveform 488 in a number of ways. For example, the waveform analysis module 486 can search for local minima in the message waveform 488, which can correspond to the silence between words. In another example, the he waveform analysis module 486 can analyze the message waveform 488 by implementing speech recognition algorithms. In another example, the waveform analysis module 486 can analyze the message waveform 488 to determine natural language segments, such as clauses or phrases within the message waveform 488. As a specific example, the waveform analysis module 486 can determine that two natural language segments exist in the message waveform 488 of the audio communication 222 "When you get there, can you call me?" In this specific example, the waveform analysis module 486 can determine the first instance of the natural language segment as "when you get there" and the second instance of the natural language segment as "can you call me?" based on the pause, represented here by the comma.

The contemporaneous message module 474 can implement a message intersperse module 492 to determine an intersperse point 494 for the interspersed message interchange 478. The message intersperse module 492 can determine the intersperse point 494 based on the message segments 490, which are identified from analysis of message waveform 488 for the current audio message 470. For example, the message intersperse module 492 can select the intersperse point 494 as the point between the message segments 490 that is closest in time to the message delivery timeframe 468. As a specific example, if the message delivery timeframe 468 occurs in the middle of the instance of message segments 490 for "going," the intersperse module 492 can select the intersperse point 494 as the point before or after the word "going." In another example, the message intersperse module 492 can determine the intersperse point 494 based on the natural language segment. As a specific example, the intersperse point 494 can be selected as the point between the instances of the natural language segment, for delivery of the contemporaneous audio message 472 between two complete clauses, which provides the benefit of a logical or more understandable interruption and resumption of the current audio message 470.

It has been discovered that the determination of the interspersed message interchange 478 based on analysis of the message waveform 488 improves clarity for delivery of the audio communication 222. Analysis of the message waveform 488 enables the navigation system 100 to identify the message segments 490 and select the intersperse point 494 for the contemporaneous audio message 472, which avoids clipping or cutting off words in the current audio message 470 and provides clear delivery of the audio communication 222.

The message delivery module 442 can deliver the current audio message 470 and the contemporaneous audio message 472 based on the audio message interchange 476. As an example, for the audio message interchange 476 determined as the sequential message interchange 480, the message delivery module 442 can complete delivery of the current audio message 470 followed by sequential delivery of the contemporaneous audio message 472.

In another example, for the audio message interchange 476 determined as the interspersed message interchange 478, the message delivery module 442 can resume the current audio message 470 in a number of different ways following the interspersed delivery of the contemporaneous audio message 472. As an illustration, for the following implementations, the intersperse point 494 for the current audio message 470 of "Are you going to the game tonight," can occur between "to" and "the." Further, each word of the current audio message 470 can be a single instance of the message segments 490 as described in the discussion of the waveform analysis module 486 above.

In one implementation, the message delivery module 442 can resume the current audio message 470 from the intersperse point 494. For example, the remaining portion of the current audio message 470 can be delivered by the message delivery module 442 as "the game tonight?"

In another implementation, the message delivery module 442 can resume the current audio message 470 to include one or more of the message segments 490 prior to the intersperse point 494. For example, the remaining portion of the current audio message 470 can include the message segments 490 of "going" and "to." To continue the example, the message delivery module 442 can deliver the updated remaining portion of the current audio message 470 as "going to the game tonight?"

In a further implementation, the message delivery module 442 can restart delivery current audio message 470 from the beginning of the current audio message 470. For example, in a situation where the intersperse point 494 is selected from the message segments 490 near the beginning of the current audio message 470, the message delivery module 442 can restart delivery from the beginning of the current audio message 470.

In yet a further implementation, the message delivery module 442 can intersperse the audio communication 222 having the high message priority 456 with an instance of the audio communication 222 having the low message priority 458. In general, as described above, the audio communication 222 having the high message priority 456 is not interrupted by the audio communication 222 having the low message priority 456. In the situation of the audio communication 222 including the navigation notification 218, the message delivery module 442 can implement the above modules to determine the intersperse point 494 when sufficient time exists for interruption of the navigation notification 218 having sequentially linked notifications. As a specific example, the sequentially linked notifications can be "stay in the right lane" and "then turn right at main street," In this specific example, if the message delivery time 468 for the contemporaneous audio message 472 has a duration that allows delivery of the navigation notification 218 before the navigation notification 218 becomes irrelevant.

The navigation system 100 can manage concurrent delivery of the audio communication 222 and playback of media content 498 with the concurrent media module 444. The media content 498 can include audio content, such as music, podcasts, audio books, or other forms of information or audio based entertainment media. For example, during delivery of the audio communication 222, including the current audio message 470 and the contemporaneous audio message 472, the concurrent media module 444 concurrently or simultaneously deliver the media content 498 at a lower volume relative to the volume of the audio communication 222.

The navigation system 100 has been described with module functions or order as an example. The navigation system 100 can partition the modules differently or order the modules differently. As an example, the first control unit 312, the second control unit 334, or a combination thereof, can implement the queue management module 440, the message delivery module 442, the concurrent media module 444, communication overlap module 464, the contemporaneous message module 474, the waveform analysis module 486, the message intersperse module 492, or a combination thereof to execute the functions of the modules described above. In another example, the navigation system 100 can implement the first communication unit 316, the second communication unit 336, or a combination thereof to deliver the audio communication 222, including the current audio message 470 and the contemporaneous audio message 472. In a further example, the first communication unit 316 can be implemented to deliver the media content 498.

The modules described in this application can be hardware implementation or hardware accelerators in the first control unit 316 of FIG. 3 or in the second control unit 338 of FIG. 3. The modules can also be hardware implementation or hardware accelerators within the first device 102 or the second device 106 but outside of the first control unit 316 or the second control unit 338, respectively, as depicted in FIG. 3. However, it is understood that the first control unit 316, the second control unit 338, or a combination thereof can collectively refer to all hardware accelerators for the modules.

The modules described in this application can be implemented as instructions stored on a non-transitory computer readable medium to be executed by a first control unit 312, the second control unit 336, or a combination thereof. The non-transitory computer medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

The physical transformation from the navigation information to the graphical representation of the navigation information, such as the navigation map 214 and current location 216 of the user results in the movement in the physical world, such as such as the user following the navigation notifications 218 to follow a route on the navigation map 214. Movement in the physical world results in changes to the navigation notifications 218 due to delivery of the audio communication 222.

Figure 5:
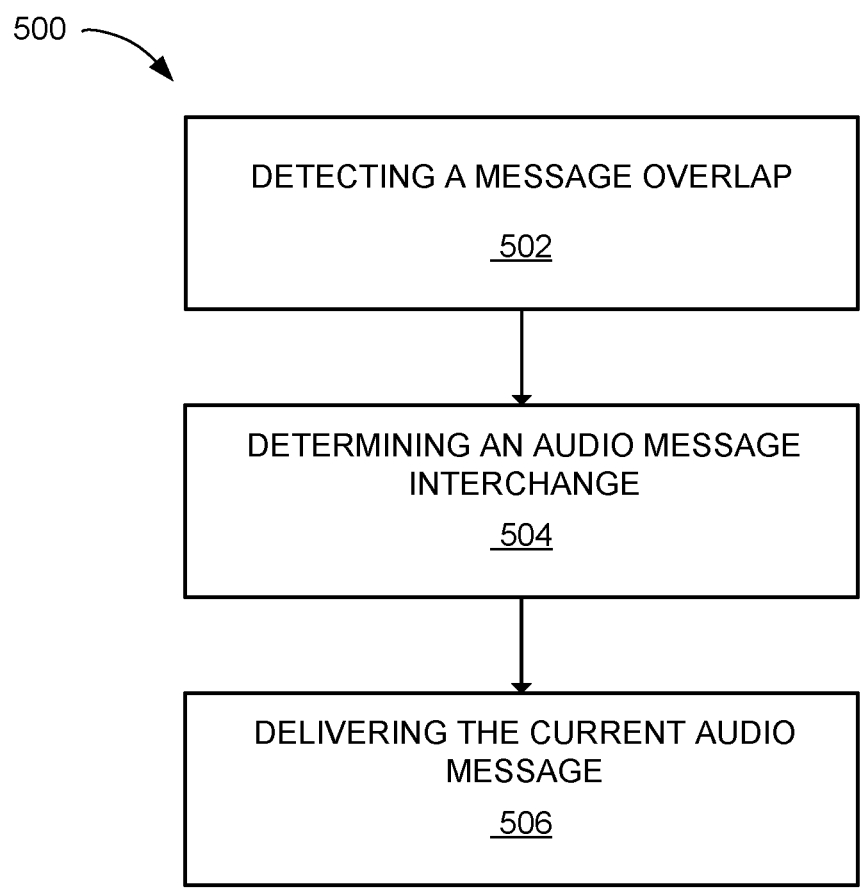
FIG. 5 is a flow chart of a method of operation of a navigation system in an embodiment of the present invention.

Referring now to FIG. 5, therein is shown a flow chart of a method 500 of operation of a navigation system 100 in an embodiment of the present invention. The method 500 includes: detecting a message overlap between a current audio message and a message delivery timeframe of a contemporaneous audio message in a block 502; determining an audio message interchange between the current audio message and a contemporaneous audio message based on a message waveform of the current audio message, a remaining message duration of the current audio message, or a combination thereof in a block 504; and delivering the current audio message and the contemporaneous audio message based on the audio message interchange in a block 506.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising:
a control unit, including a processor, configured to:
determine a message type for an audio communication and strong the audio communication in a high priority queue or a low priority queue based on the message type;
detect a message overlap between a current audio message as an instance of the audio communication in the low priority queue and a message delivery timeframe of a contemporaneous audio message as a further instance of the audio communication in the high priority queue;
analyze a message waveform of the current audio message to identify message segments in the current audio message;
determine an audio message interchange between the current audio message and the contemporaneous audio message based on the message segments of the message waveform of the current audio message and a remaining message duration of the current audio message based on a completion threshold, wherein:
the completion threshold determines whether delivery of the current audio message is near completion according to a percentage of the total length of the current audio message;
the remaining message duration is the amount of time between the message delivery timeframe of the contemporaneous audio message and a completion time of the current audio message; and
the message delivery timeframe is the point in time that the contemporaneous audio message is scheduled for delivery; and
a communication unit, including a microelectronic component and coupled to the control unit, configured to deliver the current audio message and the contemporaneous audio message based on the audio message interchange.

2. The system as claimed in claim 1 wherein the control unit is configured to determine the audio message interchange as an interspersed message interchange based on the remaining message duration of the current audio message exceeding the completion threshold of the contemporaneous audio message.

3. The system as claimed in claim 1 wherein the control unit is configured to determine the audio message interchange as a sequential message interchange based on the remaining message duration of the current audio message being below the completion threshold of the contemporaneous audio message.

4. The system as claimed in claim 1 wherein the control unit is configured to:
select an intersperse point based on the message segments for delivery of the contemporaneous audio message.

5. The system as claimed in claim 1 wherein the communication unit is configured to deliver the current audio message and the contemporaneous audio message based on a message priority.

6. The system as claimed in claim 1 wherein the control unit is configured to restart the current audio message from the beginning of the current audio message for the audio message interchange determined as an interspersed message interchange.

7. The system as claimed in claim 1 wherein:
the control unit is configured to:
select an intersperse point from one of the message segments for communication of the contemporaneous audio message;
pause the current audio message at the intersperse point; and
the communication unit is configured to repeat one of the message segments prior to the intersperse point upon resuming delivery of the current audio message for the audio message interchange determined as an interspersed message interchange.

8. The system as claimed in claim 1 wherein the communication unit is configured to concurrently deliver a media content at a lower volume relative to the volume of the current audio message during delivery of the current audio message.

9. The system as claimed in claim 1 wherein the control unit is configured to determine a message priority for the current audio message wherein the message priority is determined as a high priority message or a low priority message based on the message type.

10. The system as claimed in claim 1 wherein the communication unit is configured to deliver the contemporaneous audio message as a navigation notification.

11. A method of operation of a navigation system comprising:
determining, with a processor, a message type for an audio communication and storing the audio communication in a high priority queue or a low priority queue based on the message type;
detecting, with the processor, a message overlap between a current audio message as an instance of the audio communication in the low priority queue and a message delivery timeframe of a contemporaneous audio message as a further instance of the audio communication in the high priority queue;
analyzing, with the processor, a message waveform of the current audio message to identify message segments in the current audio message;
determining, with the processor, an audio message interchange between the current audio message and the contemporaneous audio message based on the message segments of the message waveform of the current audio message and a remaining message duration of the current audio message based on a completion threshold, wherein:
the completion threshold determines whether delivery of the current audio message is near completion according to a percentage of the total length of the current audio message;
the remaining message duration is the amount of time between the message delivery timeframe of the contemporaneous audio message and a completion time of the current audio message;
the message delivery timeframe is the point in time that the contemporaneous audio message is scheduled for delivery; and
delivering the current audio message and the contemporaneous audio message based on the audio message interchange.

12. The method as claimed in claim 11 wherein determining the audio message interchange includes determining the audio message interchange as an interspersed message interchange based on the remaining message duration of the current audio message exceeding the completion threshold of the contemporaneous audio message.

13. The method as claimed in claim 11 wherein determining the audio message interchange includes determining the audio message interchange as a sequential message interchange based on the remaining message duration of the current audio message being below the completion threshold of the contemporaneous audio message.

14. The method as claimed in claim 11 further comprising:
selecting an intersperse point based on the message segments for delivery of the contemporaneous audio message.

15. The method as claimed in claim 11 wherein delivering the current audio message and the contemporaneous audio message includes delivering the current audio message and the contemporaneous audio message based on a message priority.

16. A non-transitory computer readable medium including instructions for a navigation system comprising:
determining, with a processor, a message type for an audio communication and storing the audio communication in a high priority queue or a low priority queue based in the message type;
detecting, with the processor, a message overlap between a current audio message as an instance of the audio communication in the low priority queue and a message delivery timeframe of a contemporaneous audio message as a further instance of the audio communication in the high priority queue;
analyzing, with the processor, a message waveform of the current audio message to identify message segments in the current audio message;
determining, with the processor, an audio message interchange between the current audio message and the contemporaneous audio message based on the message segments of the message waveform of the current audio message and a remaining message duration of the current audio message and based on a completion threshold, wherein:
the completion threshold determines whether delivery of the current audio message is near completion according to a percentage of the total length of the current audio message;
the remaining message duration is the amount of time between the message delivery timeframe of the contemporaneous audio message and a completion time of the current audio message;
the message delivery timeframe is the point in time that the contemporaneous audio message is scheduled for delivery; and
delivering the current audio message and the contemporaneous audio message based on the audio message interchange.

17. The non-transitory computer readable medium as claimed in 16 wherein determining the audio message interchange includes determining the audio message interchange as an interspersed message interchange based on the remaining message duration of the current audio message exceeding the completion threshold of the contemporaneous audio message.

18. The non-transitory computer readable medium as claimed in 16 wherein determining the audio message interchange includes determining the audio message interchange as a sequential message interchange based on the remaining message duration of the current audio message being below the completion threshold of the contemporaneous audio message.

19. The non-transitory computer readable medium as claimed in 16 further comprising:
   selecting an intersperse point based on the message segments for delivery of the contemporaneous audio message.

20. The non-transitory computer readable medium as claimed in 16 wherein delivering the current audio message and the contemporaneous audio message includes delivering the current audio message and the contemporaneous audio message based on a message priority.

* * * * *